Nov. 9, 1943.  C. E. SWENSON  2,333,901
CORN HARVESTER
Filed Feb. 21, 1942  3 Sheets-Sheet 1
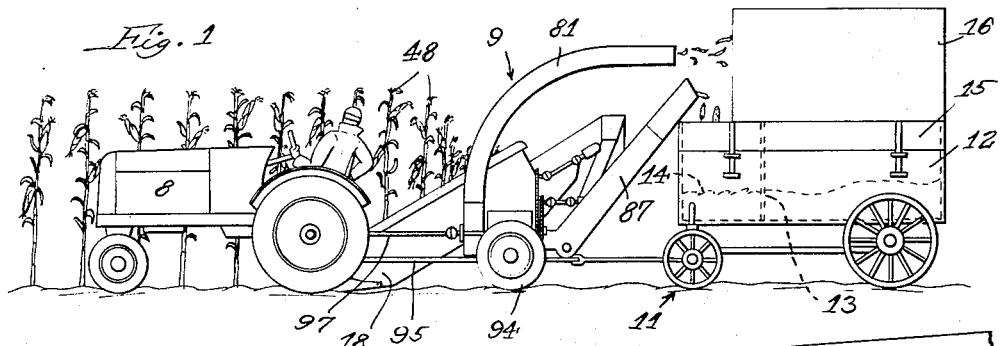
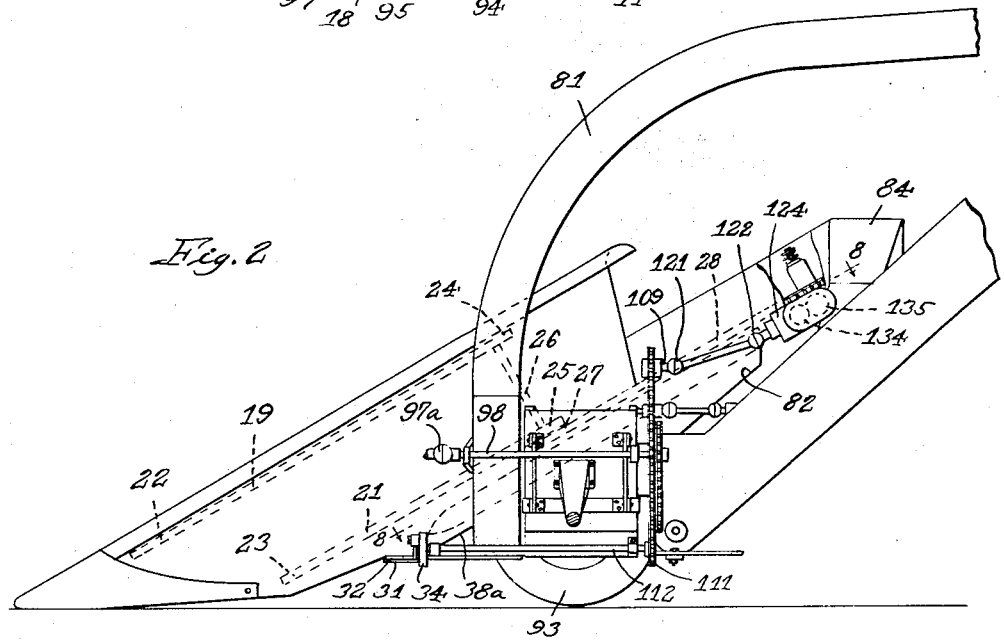
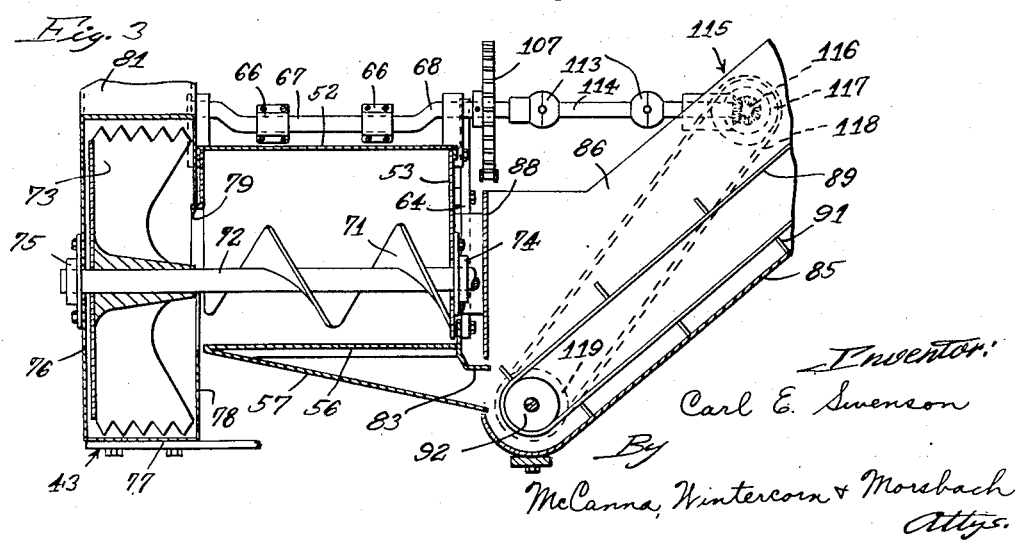
Inventor:
Carl E. Swenson
By
McCanna, Wintercorn & Morsbach
Attys.

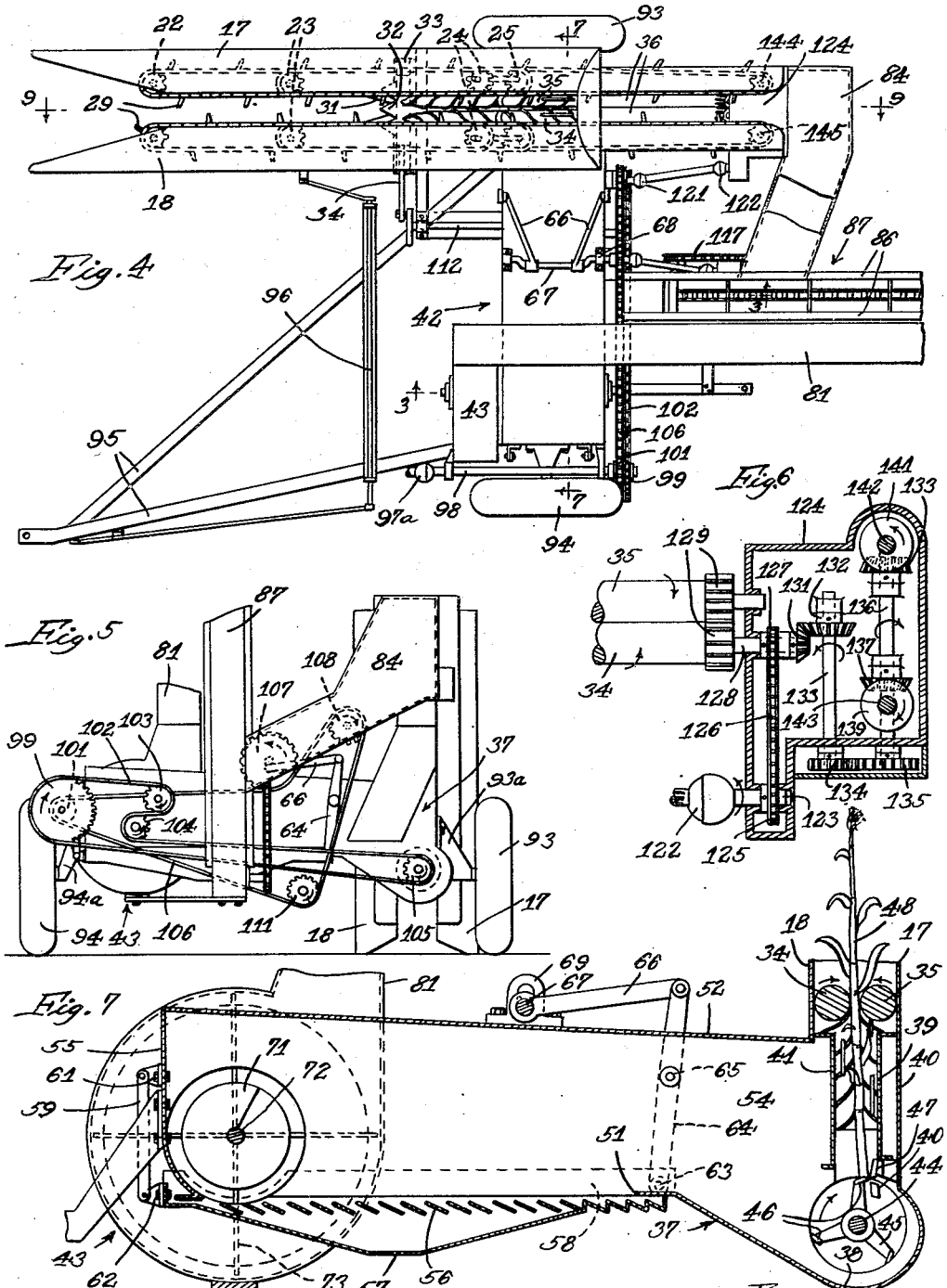

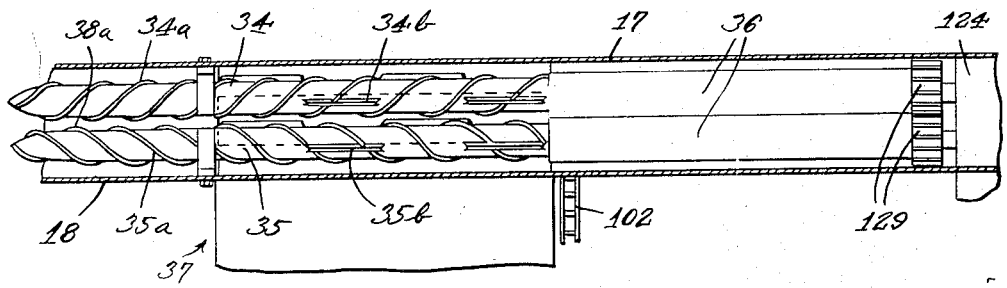
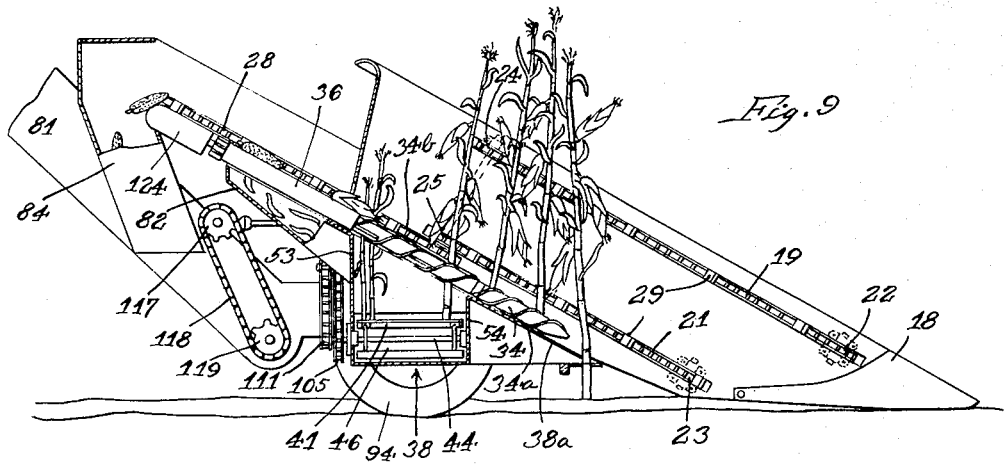

Patented Nov. 9, 1943

2,333,901

UNITED STATES PATENT OFFICE 2,333,901

CORN HARVESTER

Carl E. Swenson, Rockford, Ill., assignor of one-half to Fred M. Potgieter, Rockford, Ill.

Application February 21, 1942, Serial No. 431,802

18 Claims. (Cl. 56—64)

This invention relates to corn harvesters and has special reference to a harvester of the class wherein the stalks are cut and the ears removed therefrom in the field.

The common and usual apparatus now employed in the harvesting of field corn is the ordinary corn binder in which the stalks are cut in the field adjacent the ground and tied into bundles, the bundles being transported to a central location and there passed through a corn shredder which acts to strip the ears from the stalks, cut the stalks into suitable short lengths and deliver the ears and the stalks at separate points on the machine. These operations are slow, laborious and expensive, and furthermore, result in the loss of a substantial amount of corn which is shelled from the ears during the handling and spilled on the ground. Another common method is the use of a corn picker which passes along the row of standing corn, snapping the ears from the stalks, husking the ears, and transporting the ears to a wagon or other storage point. These machines are objectionable in that they result in the loss of the corn stalks as a crop, and in the loss of a substantial amount of shelled corn being spilled on the ground. While some effort has been made to devise a machine free of the objections of the machines now commonly used, so far as I know, none of these attempts have resulted in the production of a commercially successful machine.

An important object of the invention is the provision of a corn harvester adapted to be driven along a row of standing corn, wherein the stalks are cut adjacent to the ground, the ears are than separated from the stalks, and the ears and stalks are then conveyed to separate receptacles.

Another object of this invention is the provision of a corn harvester wherein the standing stalks are first held between gathering chains, then severed adjacent the ground, and immediately thereafter are gripped between combination snapping and feed rolls, the stalks being continually carried in approximately a standing position to a snapping and chopping station. During this operation the stalks are held in an approximately vertical position, and are fed downward through the combination snapping and feed rolls to remove the ears and thereafter to the chopper mounted immediately below the combination rolls, where the stalks are cut into convenient lengths.

Another object of this invention is the provision of a corn harvester wherein means are provided for collecting the kernels of corn, which are accidentally shelled and transporting the same, by means of a conveyer, for movement with the ear corn to a suitable receptacle.

Another object of this invention is the provision of a harvester in which the stalks are carried in an approximately upright position directly backwards to the direction of travel of the harvester, until the ears have been removed and the stalks chopped, and the chopped stalks are thereafter transferred laterally to a blower or other means of conveyance to a suitable receptacle, wherein a chopper is provided having the axis of rotation thereof substantially in the same plane as the row of corn being harvested and below the combination snapping and feed rolls.

A still further object of this invention is the provision of a corn harvester wherein the standing stalks the maintained in approximately an upright position by means of gathering chains while being severed from the ground and are thereafter immediately grasped by combination snapping and feed rolls, the chains serving to maintain the stalks in approximately an upright position as they pass backwards in and downwards through the combination snapping and feed rolls.

Another object of this invention is the provision of a corn harvester in which the stalks are guided along a definite and confined path in their movement through the combination snapping and feed rolls and the chopper.

Other objects and advantages will appear from the following description and the accompanying drawings, in which—

Figure 1 is a side elevation of a corn harvester embodying my invention;

Fig. 2 is a fragmentary side view of the embodiment shown in Figure 1, the parts being shown on a larger scale;

Fig. 3 is a vertical section taken longitudinally through the blower, the blower feed screw, and the shaker conveyer;

Fig. 4 is a top view;

Fig. 5 is a fragmentary rear view;

Fig. 6 is a fragmentary top view showing the rolls and the gathering chain gearing;

Fig. 7 is a section on the line 7—7 of Fig. 4 showing the shaker mechanism in its relative position to the chopper and to the combination snapping and feed rolls;

Fig. 8 is a sectional view taken on the line 8—8 of Fig. 2, and

Fig. 9 is a view on the line 9—9 of Fig. 4.

The invention contemplates a corn harvester of the type adapted to be moved through the corn field by automotive means, such, for example, as a tractor indicated at 8 in Figure 1, the harvester being arranged to straddle the corn rows. As will presently be described in more detail, the harvester moves along the corn row and is so built as to cut the stalks near the ground, the stalks being maintained in an approximately upright position and moved to the combination snapping and feed rolls. The combination snapping and feed rolls continue to move the stalks backwards in the harvester and at the same time to move the stalks downward through the rolls, during which operation the ears of corn carried on the stalks are snapped from the stalks and moved backwards onto husking rolls. As the stalks move downward between the snapping rolls, they are brought downward into a chopper which cuts the stalks into convenient lengths. Immediately at the point of chopping the direction of travel of the stalks is changed. The cut stalks are thrown by the cutter head transversely to the direction of travel of the harvester onto a transversely mounted shaker which carries the stalks to a blower. This blower is arranged to deliver the cut stalks to a convenient receptacle. From the snapping rolls the ears of corn pass over the husking section of the rolls in the conventional manner to a convenient receptacle. Corn which may become shelled from the ears during the snapping and husking is separated from the husks and the cut stalks by means of the transversely mounted shaker and are conveyed to the ear corn receptacle.

As shown in Figure 1, the harvester includes a harvester unit proper as indicated at 9 and may or may not include a wagon indicated generally by the numeral 11. In this instance the wagon has a box 12 provided with a partition 13 dividing the box into a small ear corn compartment 14 and a larger roughage or stalk compartment 15, the relative sizes of these two compartments being suitably adjusted so as to hold the ear corn and roughage in suitable proportions. That portion of the wagon over the compartment 15 is in this instance covered by a canopy 16 or other cloth or net enclosure extending over the top and at the back. The harvester proper has gathering elements 17 and 18 of generally conventional nature, these gathering elements commonly being formed of sheet metal which serve to gather the corn stalks therebetween as the harvester is moved along the row, the row of corn passing between the two gathering elements as the harvester moves forward. These gathering elements are suitably inclined and shaped as will be apparent from Figs. 1 and 2 so as to serve in raising and maintaining the stalks in an approximately upright position. Upper and lower gathering chains indicated by the numerals 19 and 21 are mounted in each of the gathering elements disposed over idling sprockets 22 and 23 toward the front end and over driving sprockets 24 and 25 at the rear end thereof, the sprockets 24 and 25 being carried on a shaft 26 which is in turn driven from a sprocket 27 mounted thereon and driven from conveying chains 28 extending backwardly and upwardly over the snapping and husking portions of the rolls, as will presently more fully appear. The chains 19 and 21 are provided with the usual lugs, indicated at 29, projecting into the space between the gathering elements which act to hold the corn stalks in generally upright position as the harvester moves forward.

Mounted beneath the gathering elements 17 and 18 is a stationary cutter member 31 in the form of a V, the sides of which converge inwardly toward the rear from the sides of the gathering elements as best shown in Fig. 4, the stationary cutter cooperating with a reciprocating cutter 32 attached to a sickle bar 33, the sickle bar being movable transversely of the gathering elements and consequently crosswise of the corn row by means of a conventional type of crank mechanism as indicated at 34. This cutter serves to sever the corn stalks near the ground. Mounted immediately back of the cutters 31 and 32 are combination snapping and feed rolls 34 and 35 having, in accordance with the usual practice, pointed ends for the entrance of the corn stalks between the rolls, the rolls being inclined downwardly toward the front of the harvester so as to receive therebetween the bottom end of the stalks at about the time they are severed by the cutters, the stalks being carried backwardly by action of the gathering chains and the action of the combination rolls. It is important that the rolls establish control over the lower ends of the severed stalks at about the time they are cut loose so as to minimize the opportunity for the stalks to become misplaced. In this instance the rolls are positioned so that the lower ends of the stalks pass into the rolls immediately after severance, but the requirements of the invention are satisfied if the rolls grasp the stalks in the immediate vicinity of the cutters, and this may be either before or after severance. In this instance the rolls 34 and 35 are combined feed, snapping and husking rolls, the forward ends of the rolls having ribs 34a and 35a (Figs. 8 and 9), which serve essentially to cause the stalks to be fed backward between the rolls without any material tendency to force the stalks downward, the intermediate portion of the rolls having ribs 34a and 35a and lugs 34b and 35b which act to cause the stalks to be fed down between the rolls, the lugs being located over the chopper as will presently be described, and the rearward portion of the rolls 36 being smooth, one thereof preferably being covered with rubber in the conventional manner for the purpose of grasping the husks and stripping the same from the ear.

Mounted on the gathering elements 17 and 18 and projecting laterally, or in this instance at right angles to the center line of the row of corn being harvested, is a housing indicated generally by the numeral 37 having a top 52, spaced side walls 53 and 54, an outer end 55 and an arcuate portion 38 (note Fig. 7). The spaced side walls 53 and 54 project across the space beneath the rolls as best shown in Fig. 9 and make contact with a vertical wall 40 on the gathering element 17, whereas the arcuate bottom portion 39 also contacts the lower end of the wall 40 so as to close the housing at this end. Mounted on the elements 17 and 18 and depending within the housing is a vertical chute, the back of which is formed by the wall 53 and the forward side of which is formed by the wall 54 (note Fig. 9). The sides of the chute are formed by depending side members 39 and 41 (Fig. 7). The purpose of this chute is to guide the corn stalks from the combination rolls 34 and 35 to the cutter head presently to be described as will be apparent from Fig. 7. The housing also acts as the main frame of the harvester, wheels being attached directly thereto, as will presently be described.

Mounted below the snapping section of the combination rolls 34 and 35 and separated therefrom by the chute defined by walls 39 and 41, is a rotary cutter comprising a shaft 44 carried in suitable bearings on the housing side walls 53 and 54 and carrying spiders 45 to which are attached chopper knives 46 extending longitudinally of the corn row being harvested. The knives 46 cooperate with a stationary cutter bar 47. As the stalks of corn are fed downward by action of the combination rolls they are confined and guided by the chute, entering the chopper toward the forward end thereof as best shown in Fig. 9, the rotating knives 46 acting against the stationary bar 47 to cut the stalks into short lengths. As the stalks are moved downward, the rolls also act to move the stalks rearwardly so that the cutting action is distributed longitudinally along the knives and so that a plurality of stalks are simultaneously cut, as will be apparent from Fig. 9. The cut stalks are thrown away from the cutter and out into the housing by action of the cutter, as will be seen from Fig. 7.

It will thus be seen that as the harvester moves forward in the fields the gathering elements 17 and 18, together with the gathering chains, act to hold the corn stalks in an upright position or to elevate and straighten the corn stalks as they come into the cutters 31 and 32. At this point the stalk is severed, the bottom end of the stalk riding up along the bottom 38a and being held in upright position by the gathering chains until the bottom end of the stalk reaches substantially the elevation shown in Fig. 7. During this operation and immediately after the stalk is severed, the combination rolls 34 and 35 engage the same and assist in moving the lower end of the stalk backward. As the stalk reaches the position shown in Fig. 7, the combination rolls 34 and 35 act to feed the stalk downward so that the bottom end thereof is cut into convenient lengths by the chopper. Simultaneously with this downward movement the ears are snapped from the stalk and remain above the combination rolls 34 and 35, the rotary action of the rolls together with the action of the chain 28 acting to move the ears upward onto the husking section of the combination rolls 36 for ultimate disposition in a manner presently to be described.

The bottom opening 51 of the housing is closed by a shaker screen comprising a slotted and corrugated screen portion 56, the slots being arranged in a direction transverse to the direction of travel of the stalks through the housing and by a solid bottom tray 57, the screen and the tray being secured together for movement as a unit. The tray is shaped to cause the shelled corn passing through the screen to move toward the entrance to a conveyer (Fig. 3) under the vibratory movement of the screen and tray. The screen has upturned side edges as indicated at 58 arranged in guiding relationship with the side walls 53 and 54, one end of the screen being supported by spaced levers 59 pivotally attached to the end 55 of the housing and to the screen by blocks 61 and 62. The opposite end of the screen is supported through pivots 63 attached to the screen and tray unit and to levers 64 which are pivoted intermediate their ends as shown at 65, the upper ends of the levers being pivotally attached to connecting rods 66 which are in turn attached to a crank 67 on the shaft 68. The shaft 68 is carried in bearings 69 on the top of the housing and is driven as will presently be described to cause reciprocation of the lever 64 and thereby impart shaking movement to the screen and the tray unit.

In operation, as the stalks are chopped by action of the cutter bars 46, rotation of the chopper causes the stalks to be thrown up over the bottom portion 38 and onto the screen 56. Thereafter reciprocation of the screen causes the corn stalks to be moved toward the left hand end of the housing. As the stalks reach the left hand or blower end of the housing they are moved into the blower by suction assisted by a screw 71 carried on a shaft 72. The blower 43 includes the impeller blades 73, carried on a shaft 72, the shaft being mounted in bearings 74 and 75 located in the side wall 53 and in a wall 76 of the blower. The blower 76 also has a peripheral wall 77 and a wall 78 adjacent the housing 37, the wall 78 having an opening as shown at 79 for the entrance of the stalks to the blower. Attached to the blower is a delivery pipe 81 which conducts the chopped stalks to a suitable receptacle which may be the rear corn compartment of a wagon as shown.

The ears of corn reaching the husking section of the combination rolls 36 are carried over these rolls by action of the chains 28, the rolls serving to remove the husks, which husks drop through the husking rolls and pass downwardly through an upwardly extending chute 82 attached to the housing, extending upwardly under the husking portion of the rolls and delivering into the side of the housing (Figs. 2 and 9). The husks together with the corn shelled during husking are thence carried with the corn stalks over the screen and the husks pass out through the blower. Any kernels of corn which are shelled from the ear during the snapping of the ears and/or during the husking operations, drop down through the spaces around the combination rolls into the chopper and thence are carried out over the screen 56. While the cut stalks and husks are being moved along the screen through its reciprocating movement, the kernels of corn sift down through the screen onto the bottom tray 57, and due to the reciprocating movement of this tray, pass down to the center of the tray and through the opening 83 and then by any convenient method to the ear corn receptacle, as into a conveyer as shown in Fig. 3.

The ears of corn are moved up over the husking portion of the combination rolls and at the upper ends of the chains 28 into a chute and thence by any convenient method to a suitable receptacle, in this instance by a pipe 84 communicating with a trough formed by a bottom wall 85 and side walls 86 of a conveyer designated generally by the numeral 87, the ears passing down the chute into the conveyer. The lower end of the chute is attached to the side of the housing portion 42 and has an end wall as shown at 88 in Fig. 3, the end wall having an opening for the reception of the outlet opening 83 of the tray 57. The trough extends upwardly and rearwardly as best shown in Figs. 1 and 2 so as to convey the ears of corn to the compartment 14 of the wagon 11. Disposed within the chute is a conveyer blade 89 having the usual lugs, buckets or the like, as indicated at 91, the belt being trained over a roll 92 at the bottom end of the trough and over a similar roll at the upper end of the trough in accordance with conventional practice. The conveyer belt 89 and lugs 91 are of such nature that shelled corn deposited in the lower end of the trough through the opening 83 is carried upwardly in the conveyer and deposited with the ear corn.

The harvester is moved through the field preferably on conventional rubber tire wheels, as indicated at 93 and 94, which in this instance are attached to the housing 37 by brackets 93a and 94a, the housing being formed of metal of such strength as to permit mounting in this manner. The motive power may be provided by a tractor 8 or other suitable automotive vehicle connected to the harvester by means of draw bars 95 having a gathering point height adjusting lever mechanism 96 of conventional and well known design acting between the draw bar and the gathering element 18, as best shown in Fig. 4. Power may be supplied from a power take-off shaft 97 in the usual manner, connected to a shaft 98 mounted on bearings attached to the blower and to the housing portion 42 through a universal joint assembly 97a. The shaft 98 carries a sprocket 99 and a sprocket 101. The sprocket 99 carries a chain 102 trained over an adjustable idler 103 and around a sprocket 104 mounted on the shaft 72 for driving the blower 43, the chain thence passing around a sprocket 105 fixed to the shaft 44 of the chopper, and thence back around the drive sprocket 99, the drive sprocket 99 thus driving the blower and the chopper.

Trained over the sprocket 101 is a chain 106 which passes under the sprocket 107 attached to the shaft 68 for driving the screen 56 and the conveyer 97 and over a sprocket 108 fixed to a shaft 109 for driving the snapping rolls and associated mechanism. The chain then passes over a sprocket 111 carried on a shaft 112 attached to the crank 34 of the cutter 32, as best shown in Figs. 2 and 4, the chain then passing back over the drive sprocket 101.

The shaft 68 (Fig. 3) serves through universal joints 113 and torque tube 114 to drive quarter-turn gearing indicated generally by the numeral 115, which acts to drive a shaft 116 carrying a sprocket 117 upon which a chain 118 is trained, the chain 118 acting to drive a sprocket 119 positioned on the shaft of the roll 92 of the ear corn conveyer.

The sprocket 108 drives the shaft 109 and through universal joints 121 and 122, and the intermediate torque tube acts to drive a stub shaft 123 disposed within a housing 124 at the upper ends of the combined snapping, feed and husking rolls 34 and 35. The shaft 123 carries a sprocket 125 (note Fig. 6), which drives a chain 126 trained over a sprocket 127 on the shaft 128 of the roll 34 so as to drive the roll 34 in the direction indicated by the arrow. The rolls 34 and 35 carry intermeshing gears 129 through which the roll 35 is driven in the conventional manner. The shaft 128 also carries a quarter-turn gear 131 which drives a quarter-turn gear 132 carried on a shaft 133, one end of which projects through the casing 124 and carries a pick-off gear 134 on the outside of the casing, which pick-off gear engages and drives a second pick-off gear 135 disposed on a shaft 136 passing through the casing. Quarter-turn gears 137 and 138 are positioned on the shaft 136 and engage gears 139 and 141 attached to spindles 142 and 143, the spindles 142 and 143 having sprockets 144 and 145 (Fig. 4) disposed thereon to drive the chains 28. It will be seen that with this construction the pick-off gears 134 and 135 are readily accessible so that they can be conveniently changed and thus serve the purpose of changing the speed of the gathering chains relative to the speed of the rolls. This is advisable in that nicety of operation in the harvester makes it desirable that the speed of the gathering chain be coordinated with the speed of the rolls and the harvester over the ground so that there is not a tendency for the stalks to bunch in the snapping rolls and so that the snapping rolls and chopper dispose of the stalks at the same rate at which they pass into the machine.

An important feature of this improved harvester is that the corn stalks move longitudinally of the machine, that is, in a direction parallel to the direction of travel of the machine and in a single plane until they reach the chopper and are cut into short lengths, that is, all of the movement prior to chopping is in a single plane and that when chopped, the small lengths are moved transversely or at right angles to this plane. This results in a machine of very compact nature, and it also provides a simple structure capable of continuous operation without clogging under field conditions.

Another important feature of the invention is the fact that the center line of the chopper is substantially parallel to the corn row being harvested and immediately below the combination snapping and feed rolls so that the long stalks of corn are moved only through a minimum distance prior to being chopped into small pieces and in a substantially straight line and single plane.

Attention is also directed to the fact that the chopper is arranged directly below the rolls and directly behind the cutter so that the stalks are moved directly from the cutter into the chopper and are held in their upright positions and maintained in their normal spaced relation so that the stalks move longitudinally of the chopper while being cut into short lengths. This means not only a minimum amount of handling and movement of the stalks prior to entry into the chopper, but also permits a plurality of stalks to be simultaneously cut while being moved backward in the machine so as to minimize the possibility of clogging and also to distribute the wear over the full length of the chopper blades.

Another important feature of the invention is the fact that the shelled corn produced during the harvesting operation is moved along with the other products of the harvesting and conveyed to the same compartment as the ear corn.

Another important feature of the invention is the separate functions of the combination rolls, i. e. one pair of rolls serving to help gather the stalks, snap the ears from the stalks, feed the stalks to the cutter, and remove the husks from the ears, at the same time moving the stalks backward from the sickle to the snapping and feed section.

A still further feature of the invention lies in the fact that the cutter and snapping rolls are so arranged that the snapping rolls take care of the stalk immediately after the stalk is cut and the stalk is pinched between these rolls until cut into smaller pieces capable of easy handling. This feature reduces to a minimum the likelihood of the machine becoming clogged by misplacement of the long stalks. It will also be observed that the stalk is not cut off until it is held in upright position by the gathering chains.

Another important feature is that as the stalks are fed down from the snapping rolls into the chopper, they are guided in a definite channel and confined by the depending walls 39 and 41 and by walls 53 and 54.

Another important feature of the invention is that through a single operation in the field the corn is cut, the ears are removed and husked, the stalks are chopped, and the ears and stalks are deposited into separate receptacles or compartments of a conveyance to make a complete harvesting operation. In this way the roughage is preserved for transportation directly from the machine to a point of use, or permanent storage without the necessity of any manual handling thereof. The invention thus permits of harvesting, separating and loading all of the products of the harvesting operation and reduces the required labor to a minimum.

While I have thus described and illustrated a specific embodiment of the invention, it will be obvious that the principles thereof may be combined in numerous specific embodiments within the spirit of the invention.

I claim:

1. The combination in a corn harvester of a cutter for severing the stalks of standing corn near the ground, a pair of combination rolls extending upwardly and backwardly from adjacent said cutter to grasp the stalks therebetween at about the time of severance and feed the same backward and then backward and downward to snap the ears therefrom, and a chopper disposed beneath said rolls to receive the stalks therefrom and cut the same into short lengths.

2. The combination in a corn harvester of a cutter for severing the stalks of standing corn near the ground, a pair of combination rolls extending upwardly and backwardly from adjacent said cutter and in parallelism with the corn row to receive the stalks therebetween, said rolls having a lower feeding portion shaped to grasp the stalks therebetween at about the point of severance and feed the same backward in single file in an upstanding plane, an intermediate feeding and snapping portion to feed the stalks backward and downward to snap the ears therefrom, and a rearwardly disposed husking portion for removing the husks from the ears, and a chopper disposed beneath said feeding and snapping portion of the rolls to receive the stalks therefrom and cut the same into short lengths.

3. The combination in a corn harvester of a cutter for severing the stalks of standing corn near the ground, a pair of combination rolls extending upwardly and backwardly from adjacent said cutter, said rolls having a lower portion shaped to grasp the stalks therebetween at about the time of severance to feed the same backward and then backward and downward to snap the ears therefrom, a chopper disposed beneath said rolls to receive the stalks therefrom as fed downwardly and cut the same into short lengths, and means positioned between the rolls and the chopper forming a confined passage for surrounding the stalks as they pass downward between the rolls and the chopper.

4. The combination in a corn harvester of a cutter for severing the standing stalks near the ground, rolls supported for movement in parallelism with the corn row positioned to grasp the stalks near said cutter, gathering chains disposed on opposite sides of the row to assist in holding the stalks in upright position in the cutter and the rolls, a chopper disposed below said rolls, means for driving the rolls to feed the stalks downward therethrough and into said chopper and simultaneously to snap the ears therefrom, a blower laterally spaced from said chopper for conveying the chopped stalks to a remote storage point, and means for moving the chopped stalks at right angles to the corn row from said chopper to said blower and for separating the shelled corn from the stalks comprising a shaker screen through which the shelled corn passes.

5. The combination in a corn harvester of a cutter for severing the standing stalks near the ground, snapping rolls supported for movement in parallelism with the corn row positioned to receive the stalks therebetween immediately after severance and feed the same downward therebetween to snap the ears from the stalks, a housing extending laterally of said rolls, a shaker in said housing and a chopper positioned below said rolls to receive the corn shelled during snapping and to chop the stalks as they pass downwardly between said rolls, said chopper discharging the chopped stalks laterally in said housing on to said shaker to separate the shelled corn from the chopped material.

6. The combination in a corn harvester of a cutter for severing the standing stalks from the ground, combined snapping and husking rolls supported for movement in parallelism with the corn row positioned to receive the stalks therebetween immediately after severance and feed the same backward and then backward and downward therebetween to snap the ears from the stalks, a housing extending laterally of said rolls, a chopper positioned in said housing below said rolls to chop the stalks as they pass downwardly therebetween and to receive corn shelled during snapping and husking, said chopper discharging the chopped stalks and shelled corn laterally in said housing, a blower communicating with said housing adjacent the end thereof opposite said chopper for moving the chopped stalks from said housing to a remote storage point, and a shaker screen mechanism in said housing reciprocable in a direction to move said stalks thereover toward the blower and to seperate shelled corn from the stalks.

7. The combination in a corn harvester of a cutter for severing the standing stalks from the ground, snapping rolls disposed in parallelism for movement on opposite sides of the corn row and positioned to receive the stalks therebetween immediately after severance to feed the same downward therebetween and snap the ears from the stalks, a housing extending beneath and laterally of said rolls, said housing having an open bottom, a chopper in said housing positioned below said rolls to chop the stalks as they pass downward therebetween and to receive corn shelled during snapping, said chopper discharging the chopped stalks laterally in said housing, a blower communicating with said housing adjacent the end thereof opposite said chopper for moving the chopped stalks from said housing to a remote storage point, a shaker screen disposed under the opening in said housing for passage of stalks thereover, a tray under said screen, means for reciprocating said screen in a horizontal plane to move the stalks along said housing toward the blower and to sift shelled corn therethrough onto said tray, said tray being shaped for movement of the shelled corn therealong under the reciprocating action toward a central delivery point.

8. The combination in a corn harvester of a cutter for severing the standing stalks from the ground, snapping rolls supported for movement in parallelism with the corn row on opposite sides thereof to grasp the stalks therebetween immediately after severance, and a chopper disposed beneath said snapping rolls and receiving the stalks therefrom to cut the stalks into short lengths, said chopper comprising a stationary cutter bar extending in a plane parallel with the snapping rolls, and a rotary cutter disposed on an axis parallel with said rolls and having a plurality of cutter blades operative against said stationary cutter bar to cut the stalks therebetween.

9. The combination in a corn harvester of a cutter for severing the stalks of standing corn from the ground, snapping rolls disposed rearwardly of said cutter for grasping the stalks immediately after severance and for feeding the stalks downwardly therebetween to snap the ears therefrom, means for supporting said stalks in upright position and moving the stalks rearwardly between said rolls, a chopper positioned beneath said rolls to receive the stalks from said snapping roll and cut the same into short lengths, and means on opposite sides of the row between said rolls and said chopper for confining the stalks against lateral displacement during the movement thereof from the rolls to the chopper.

10. The combination in a corn harvester of a cutter for severing the stalks of standing corn near the ground, a pair of combination rolls extending upwardly and backwardly from adjacent said cutter and in parallelism with the corn row to receive the stalks therebetween, said rolls having a lower feeding portion shaped to grasp the stalks therebetween at about the point of severance and feed the same backward single file in an upstanding plane, an intermediate feeding and snapping portion to feed the stalks backward and downward to snap the ears therefrom and a rearwardly disposed husking portion for removing the husks from the ears, and a chopper disposed beneath said intermediate portion, operating along substantially the entire length thereof to successively cut short lengths from the lower ends of the stalks disposed in said plane as they move backwardly and downwardly between the intermediate portion of said rolls 11. The combination in a corn harvester of a cutter for severing the stalks of standing corn near the ground, a pair of combination rolls extending upwardly and backwardly from adjacent said cutter to grasp the stalks therebetween at about the time of severance and feed the same backward and then backward and downward to snap the ears therefrom, and a chopper disposed beneath said rolls rotatable on an axis approaching parallelism with the corn row being cut to receive the stalks from said rolls, cut the same into short lengths and discharge the cut stalks laterally with respect to the corn row.

12. The combination in a corn harvester of a cutter for severing the stalks of standing corn near the ground, a pair of combination rolls extending upwardly and backwardly from adjacent said cutter to grasp the stalks therebetween at about the time of severance and feed the same backward and then backward and downward in the plane of the corn row to snap the ears therefrom, a shaker disposed below and to one side of said rolls, and a rotatable chopper disposed beneath said rolls on an axis approaching parallelism with the corn row to receive the stalks and shelled corn from said rolls, cut the stalks into short lengths and discharge the same together with the shelled corn onto said shaker for separation of the shelled corn from the chopped stalks.

13. The combination in a corn harvester of a cutter for severing the stalks of standing corn near the ground, a pair of combination rolls extending upwardly and backwardly from adjacent said cutter, said rolls having a lower portion shaped to grasp the stalks therebetween at about the time of severance to feed the same backward and a second portion for feeding the stalks backward and downward to snap the ears therefrom, a rotatable chopper disposed beneath said second portion on an axis approaching parallelism with the row of corn being cut to receive the stalks from said rolls and cut the same into short lengths, and means positioned between the rolls and the chopper beneath said second portion forming a confined passage for the stalks comprising side walls disposed on opposite sides of the plane of said stalks connected by end walls adjacent the ends of said chopper.

14. The combination in a corn harvester of a cutter for severing stalks of standing corn near the ground, a pair of combination rolls extending upwardly and backwardly from adjacent said cutter, said rolls having a lower portion shaped to grasp the stalks therebetween at about the time of severance to feed the same backward in single file and in an upstanding plane and a second portion for feeding the stalks backward and downward to snap the ears therefrom, a chopper below said second portion operating along substantially the entire length thereof to successively cut short lengths from the lower ends of the stalks disposed in said plane as they move backwardly and downwardly between said second portion of said rolls, and means positioned beneath the rolls and the chopper beneath said second portion forming a confined passage for the stalks comprising side walls disposed on opposite sides of the plane of said stalks connected by end walls adjacent the ends of said chopper.

15. The combination in a corn harvester of a cutter for severing the stalks of standing corn near the ground, a pair of combination rolls extending upwardly and backwardly from adjacent said cutter and in parallelism with the corn row to receive the stalks therebetween, said rolls having a lower feeding portion shaped to grasp the stalks therebetween at about the point of severance and feed the same backward single file in an upstanding plane, an intermediate feeding and snapping portion to feed the stalks backward and downward to snap the ears therefrom, and a rearwardly disposed husking portion for removing the husks from the ears, a chopper below said intermediate portion operating along substantially the entire length thereof to successively cut short lengths from the lower ends of the stalks disposed in said plane and to receive corn shelled during snapping, a shaker disposed at one side of said chopper for receiving the shelled corn and chopped stalks from said chopper for separating the chopped stalks from the shelled corn, and a chute below said husking section for delivering the husks and the corn shelled during husking to said chopper.

16. The combination in a corn harvester of a cutter for severing the standing stalks from the ground, snapping rolls supported for movement in parallelism with the corn row on opposite sides thereof to grasp the stalks therebetween immediately after severance, a chopper disposed beneath said snapping rolls and receiving the stalks therefrom to cut the stalks into short lengths, said chopper comprising a stationary cutter bar extending in a plane parallel with the snapping rolls, and a rotary cutter disposed on an axis parallel with said rolls and having a plurality of cutter blades operative against said stationary cutter bar to cut the stalks therebetween and discharge the same out of the chopper in a direction laterally with respect to the corn row, and a shaker screen positioned beside said chopper to receive the chopped material and separate the shelled corn from the stalks and move said material laterally away from the chopper.

17. The combination in a corn harvester of a cutter for severing the standing stalks from the ground, combination snapping and husking rolls supported for movement in parallelism with the corn row on opposite sides thereof, said rolls having the lower feeding portion shaped to grasp the stalks therebetween at about the point of severance and feed the same backward single file in an upstanding plane, an intermediate feeding and snapping portion to feed the stalks backward and downward to snap the ears therefrom, and a rearwardly disposed husking portion for removing the husks from the ears, a chopper disposed beneath said intermediate portion and receiving the stalks therefrom to cut the stalks into short lengths, said chopper comprising a stationary cutter bar extending in a plane parallel with the snapping rolls, and a rotary cutter disposed on an axis parallel with said rolls and having a plurality of cutter blades operative against said stationary cutter bar to cut the stalks therebetween and discharge the same out of the chopper in a direction at right angles to the corn row, a chute below said husking portion for delivering husks and corn shelled during husking to said chopper, and a shaker screen positioned beside said chopper to receive the chopped stalks and shelled corn therefrom for separating the shelled corn from the stalks.

18. The combination in a corn harvester of a cutter for severing the standing stalks from the ground, snapping rolls supported for movement in parallelism with the corn row to grasp the stalks and feed the same backward and downward in single file and in an upstanding plane to snap the ears therefrom, a rotary chopper disposed beneath said rolls on an axis approaching parallelism with said plane to successively cut short lengths from the lower ends of the stalks disposed in said plane as they move backward and downward between said rolls, to receive the corn shelled during the snapping operation and discharge the cut stalks and shelled corn in a direction laterally with respect to the corn row, and a shaker screen positioned beside said chopper for reception of the material discharged therefrom to separate the shelled corn from the stalks and transport the stalks away from the chopper.

CARL E. SWENSON.